US009794358B1

(12) United States Patent
Jurgens (10) Patent No.: US 9,794,358 B1
(45) Date of Patent: Oct. 17, 2017

(54) INFERRING THE LOCATION OF USERS IN ONLINE SOCIAL MEDIA PLATFORMS USING SOCIAL NETWORK ANALYSIS

(71) Applicant: HRL Laboratories, LLC, Malibu, CA (US)

(72) Inventor: David A. Jurgens, Rome (IT)

(73) Assignee: HRL Laboratories, LLC, Malibu, CA (US)

( * ) Notice: Subject to any disclaimer, the term of this patent is extended or adjusted under 35 U.S.C. 154(b) by 245 days.

(21) Appl. No.: 14/210,265

(22) Filed: Mar. 13, 2014

Related U.S. Application Data

(60) Provisional application No. 61/809,160, filed on Apr. 5, 2013.

(51) Int. Cl.
*G06F 15/16* (2006.01)
*H04L 29/08* (2006.01)

(52) U.S. Cl.
CPC .................. *H04L 67/22* (2013.01)

(58) Field of Classification Search
CPC . H04L 67/22; H04L 29/08936; H04L 67/306; H04L 67/18
See application file for complete search history.

(56) References Cited

U.S. PATENT DOCUMENTS

| 2011/0125826 | A1 | 5/2011 | Erhart et al. |
| 2012/0330721 | A1 | 12/2012 | Volpe et al. |
| 2013/0073336 | A1 | 3/2013 | Heath |
| 2013/0218965 | A1* | 8/2013 | Abrol ...................... H04L 67/22 709/204 |

OTHER PUBLICATIONS

Lars Backstrom et al., Find Me If You Can: Improving Geographical Prediction with Social and Spatial Proximity, Apr. 26-30, 2010, World Wide Web Conference Committee, 2010, p. 66.*
Clodoveu Davis Jr et al., Inferring the Location of Twitter Messages Based on User Relationships, Nov. 22, 2011, Transactions in GIS, 15, p. 741-744.*

(Continued)

*Primary Examiner* — Chris Parry
*Assistant Examiner* — Soe M Hlaing
(74) *Attorney, Agent, or Firm* — Tope-McKay & Associates (57) ABSTRACT

Described is a system for inferring the location of users in online social media platforms using social network analysis. A social network is first extracted from data from at least one social media platform. A mapping is generated from each user to the user's estimated geographical location in the social network, resulting in an estimated location mapping. A mapping is generated from each user to the user's known geographical location, if known, resulting in a known location mapping. The estimated location mapping is updated to match the known location mapping. The location for each user j in the known location mapping is updated in a current estimated location mapping. The final geographical locations of users connected with j are estimated using a geometric median metric. Finally, the final estimated geographical locations of users connected with j are mapped into the social network.

15 Claims, 4 Drawing Sheets

(56) References Cited

OTHER PUBLICATIONS

Cheng, Z., et al., "You are where you tweet: a content-based approach to geo-locating twitter users," In Proceedings of the 19th ACM international conference on Information and knowledge management, 2010, pp. 759-768.
PCT International Search Report and the Written Opinion of the International Searching Authority for PCT/US2014/026846, mailed Jul. 14, 2014.
Cheng, Z.; Caverlee, J.; and Lee, K. (2010) You are where you tweet: a content-based approach to geo-locating twitter users. In Proceedings of the 19th ACM international conference on Information and knowledge management, 759-768. ACM.
Davis Jr, C.; Pappa, G.; de Oliveira, D.; and de L Arcanjo, F. (2011) Inferring the location of twitter messages based on user relationships. Transactions in GIS 15(6):735-751.
Goldenberg, J., and Levy, M. (2009) Distance is not dead: Social interaction and geographical distance in the internet era. arXiv preprint arXiv:0906.3202.
Hecht, B.; Hong, L.; Suh, B.; and Chi, E. (2011) Tweets from justin bieber's heart: the dynamics of the location field in user profiles. In Proceedings of the 2011 annual conference on Human factors in computing systems, 237-246. ACM.
Ikawa, Y.; Enoki, M.; and Tatsubori, M. (2012) Location inference using microblog messages. In Proceedings of the 21st international conference companion on World Wide Web, 687-690. ACM.
Mahmud, J.; Nichols, J.; and Drews, C. (2012) Where is this tweet from? inferring home locations of twitter users. Proc AAAI ICWSM 12.
Mok, D.; Wellman, B.; and Carrasco, J. (2010) Does distance matter in the age of the internet? Urban Studies 47 (13):2747-2783.
Pontes, T.; Vasconcelos, M.; Almeida, J.; Kumaraguru, P.; and Almeida, V. (2012) We know where you live: Privacy characterization of foursquare behavior. In UbiComp '12.
Sadilek, A.; Kautz, H.; and Bigham, J. (2012) Finding your friends and following them to where you are. In Proceedings of the fifth ACM international conference on Web search and data mining, 723-732. ACM.
Zhu, Xiaojin, and Zoubin Ghahramani. Learning from labeled and unlabeled data with label propagation. Technical Report CMU-CALD-02-107. Carnegie Mellon University, (2002).
Vincenty, Thaddeus. Direct and inverse solutions of geodesics on the ellipsoid with application of nested equations. Survey review 23.176 (1975): 88-93.
Ronkainen, Oja, and Orponen. (2003). Computation of the multivariate Oja median. Developments in Robust Statistics, 344-359. http://users.ics.aalto.fi/orponen/papers/ojamed.pdf.
Vardi and Zhang. (2000). The multivariate L1-median and associated data depth. Proceedings of the National Academy of Sciences. 97(4): 1423-6. http://www.pnas.org/content/97/4/1423.full.pdf.
Johan Bollen, Alberto Pepe, and Huina Mao. "Modeling public mood and emotion: Twitter sentiment and socio-economic phenomena," ICWSM11, Barcelona, Spain , Jul. 2011.
Alec Go, Richa Bhayani, and Lei Huang. 2009, "Twitter sentiment classification using distant supervision," In Final Projects from CS224N for Spring 2008-2009 at The Stanford Natural Language Processing Group.
Roberto Gonzalez-Ibariez, Smaranda Muresan, and Nina Wacholder. 2011. "Identifying sarcasm in twitter: a closer look," In Proceedings of the 49th Annual Meeting of the Association for Computational Linguistics: Human Language Technologies: short papers—vol. 2, pp. 581-586, Portland, Oregon.
Saif Mohammad, "#Emotional Tweets," In Proceedings of the First Joint Conference on Lexical and Computational Semantics (*Sem) , Jun. 2012, Montreal , Canada.
Alexander Pak and Patrick Paroubek. 2010, "Twitter as a Corpus for Sentiment Analysis and Opinion Mining," In Proceedings of LREC.
Romero , D.; Meeder, B.; and Kleinberg, J. 2011. "Differences in the mechanics of information diffusion across topics: idioms, political hashtags, and complex contagion on twitter," In Proceedings of the 20th international conference on World wide web, 695-704. ACM.
Daniel Ramage, David Hall, Ramesh Nallapati and Christopher D. Manning. 2009. Labeled LDA: A supervised topic model for credit attribution in multi-labeled corpora Proceedings of the 2009 Conference on Empirical Methods in Natural Language Processing, pp. 248-256.
Rajaraman, A.; Ullman, J. D. 2011. "Data Mining", Mining of Massive Datasets, pp. 1-17.
Rennie et al. 2003. "Tackling the Poor Assumptions of Naïve Bayes Text Classifiers". Proceedings of the Twentieth International Conference on Machine Learning.
S.V. Buldyrev, R. Parshani, G. Paul, H.E. Stanley, S. Havlin, "Catastrophic Cascade of Failures in Interdependent Systems ," Nature 464, 08932 (2010), pp. 1025-1028.
M. Kurant, P. Thiran., "Layered complex networks," Phys. Rev. Lett. 96, (2006), pp. 138701-1-138701-4.
A.K. Elmagarmid, P.G. Ipeirotis, V.S. Verykios, "Duplicate Record Detection: A Survey", IEEE Trans on Knowledge and Data Engineering. (2007), pp. 1-16.
A. Marcus, E. Wu, D. karger, S. Madden, R. Miller, "Human-powered sorts and joints", VLDB 2012, pp. 13-24.
G. Andersson, "Causes of the 2003 major grid blackouts in North America and Europe, and recommended means to improve system dynamic performance," IEEE Trans. Power Syst., vol. 20, No. 4, pp. 1922-1928, Nov. 2005.
J.C. Laprie, K. Kanoun, M. Kaniche, "Modeling interdependencies between the electricity and information infrastructures," SAFECOMP-2007 4680, pp. 54-67.
M. Newman. Spread of epidemic disease on networks. Phys. Rev. E66, 016128 (2002), pp. 016128-1-016128-11.
J. Watts, "A simple model of global cascades on random networks," PNAS Apr. 30, 2002, vol. 99, No. 9, pp. 5766-5771.
S. Son, G. Bizhani, C. Christensen, P. Grassberger, M. Paczusk, "Percolation theory on interdependent networks based on epidemic spreading," EPL vol. 97 No. 1, 2012, pp. 16006-p1-16006-p6.
D. Jurgens, "That's what friends are for: inferring location in online communities based on social relationships," ICWSM 2013, pp. 273-282.
Jiejun Xu, Tsai-Ching Lu, Ryan Compton, David Allen, "Quantifying Cross-platform Engagement through Large-scale User Alignment," Proceedings of the 2014 ACM conference on Web science, pp. 281-282.
D. Jurgens, "That's what friends are for: Inferring location in online communities based on social relationships," ICWSM, Proceedings of the Seventh International AAAI Conference on Weblogs and Social Media. 2013. pp. 273-282.
H. Achrekar, A. Gandhe, R. Lazarus, S -H. Yu, and B. Liu, "Predicting flu trends using twitter data," in Computer Communications Workshops (INFOCOM WKSHPS), 2011 IEEE Conference on. IEEE, 2011, pp. 702-707.
M. Paul and M. Dredze, "You are what you tweet: Analyzing twitter for public health," in Fifth International AAAI Conference on Weblogs and Social Media (ICWSM 2011), Proceedings of the Fifth International AAAI Conference on Weblogs and Social Media, 2011, pp. 265-272.
D. Mocanu, A. Baronchelli, N. Perra, B. Gonalves, Q. Zhang, and A. Vespignani, "The twitter of babel: Mapping world languages through microblogging platforms," PLoS ONE, vol. 8, No. 4, p. e61981, Apr. 2013, pp. 1-9.
A. Tumasjan, T. O. Sprenger, P. G. Sandner, and I. M. Welpe, "Predicting elections with twitter: What 140 characters reveal about political sentiment," in Proceedings of the fourth international AAAI conference on weblogs and social media, 2010, pp. 178-185.
R. Compton, C. Lee, T.-C. Lu, L. D. Silva, and M. Macy, "Detecting future social unrest in unprocessed twitter data," in IEEE Intelligence and Security Informatics (ISI), 2013, pp. 56-60.
B. Mandel, A. Culotta, J. Boulahanis, D. Stark, B. Lewis, and J. Rodrigue,"A demographic analysis of online sentiment during hurricane irene," in Proceedings of the Second Workshop on Language in Social Media. Association for Computational Linguistics, 2012, pp. 27-36.

(56) References Cited

OTHER PUBLICATIONS h t p : / / thenextweb.com/2010/01/15/Twitter-geofail-023-tweets-geotagged, taken on Nov. 4, 2014.
J. Mahmud, J. Nichols, and C. Drews, "Where is this tweet from? inferring home locations of twitter users," Proc AAAI ICWSM, Proceedings of the Sixth International AAAI Conference on Weblogs and Social Media, vol. 12, 2012, pp. 511-514.
Y. Takhfeyev, A. Gruzd, and B. Wellman, "Geography of twitter networks," Social Networks, vol. 34, No. 1, pp. 73-81, 2012.
D. Mok, B. Wellman, and J. Carrasco, "Does distance matter in the age of the internet?" Urban Studies, vol. 47, No. 13, pp. 2747-2783, 2010.
J. Goldenberg and M. Levy, "Distance is not dead: Social interaction and geographical distance in the internet era," arXiv preprint arXiv:0906.3202, 2009, pp. 1-22.
X. Bresson, T. Laurent, D. Uminsky, and J. H. von Brecht, "Convergence and energy landscape for cheeger cut clustering," Part of: Advances in Neural Information Processing Systems 25 (NIPS 2012), pp. 1394-1402.
A. Szlam and X. Bresson, "Total variation and cheeger cuts," Proceedings of the 27th International Conference on Machine Learining, pp. 1039-1046, 2010.
L. Rudin, S. Osher, and E. Fatemi, "Nonlinear total variation based noise removal algorithms," Physica D: Nonlinear Phenomena, vol. 60, No. 1-4, pp. 259-268, Nov. 1992.
Granovetter, Mark S. "The Strength of Weak Ties." American Journal of Sociology, vol. 78, No. 6 (May 1973), pp. 1360-1380.
Y. Vardi and C.-H. Zhang, "The multivariate l1-median and associated data depth," Proceedings of the National Academy of Sciences, vol. 97, No. 4, pp. 1423-1426, 2000.
E. Dandes, J. Romberg, and T. Tao, "Stable Signal Recovery from Incomplete and Inaccurate Measurements arXiv : math / 0503066v2 [ math . NA ] Dec. 7, 2005," Science, vol. 40698, pp. 1-15, 2005.
A. Szlam and X. Bresson, "A total variation-based graph clustering algorithm for cheeger ratio cuts," Citeseer, 2010, pp. 1-12.
T. Goldstein and S. Osher, "The Split Bregman Method for L1-Regularized Problems," SIAM Journal on Imaging Sciences, vol. 2, No. 2, pp. 323-343, 2009.
P. Getreuer, "Total Variation Inpainting using Split Bregman," Image Processing On Line, 2 (2012), pp. 147-157.
L. M. Smith, M. S. Keegan, T. Wittman, G. O. Mohler, and A. L. Bertozzi, "Improving density estimation by incorporating spatial information," EURASIP J. Adv. Signal Process, vol. 2010, pp. 7:1-7:12, Feb. 2010.
T. Goldstein, X. Bresson, and S. Osher, "Geometric Applications of the Split Bregman Method: Segmentation and Surface Reconstruction," Journal of Scientific Computing, vol. 45, No. 1-3, pp. 272-293, Nov. 2009.
A. Chambolle, "An algorithm for total variation minimization and applications," Journal of Mathematical imaging and vision, vol. 20, No. 1-2, pp. 89-97, 2004.
M. Zhu and T. Chan, "An efficient primal-dual hybrid gradient algorithm for total variation image restoration," UCLA CAM Report, pp. 08-34, 2008.
C.-J. Hsieh, K.-W. Chang, C.-J. Lin, S. S. Keerthi, and S. Sundararajan, "A dual coordinate descent method for large-scale linear svm," in Proceedings of the 25th international conference on Machine learning, ACM, 2008, pp. 408-415.
Y. Li and S. Osher, "Coordinate descent optimization for 1 minimization with application to compressed sensing: a greedy algorithm," Inverse Probl. Imaging, vol. 3, No. 3, pp. 487-503, 2009.
J. K. Bradley, A. Kyrola, D. Bickson, and C. Guestrin, "Parallel coordinate descent for L1-regularized loss minimization," in International Conference on Machine Learning (ICML 2011), Bellevue, Washington, Jun. 2011, arXiv: 1105.5379, pp. 1-8.
P. Richt'arik and M. Tak'a'c. "Parallel coordinate descent methods for big data optimization." arXiv:1212.0873, 2012, pp. 1-43.

C. Scherrer, A. Tewari, M. Halappanavar, and D. Haglin, "Feature clustering for accelerating parallel coordinate descent," Advances in Neural Information Processing Systems 25, pp. 28-36, arXiv:1212.4174, 2012.
P. Richt'arik and M. Tak'a'c, "Efficient serial and parallel coordinate descent methods for huge-scale truss topology design," in Operations Research Proceedings 2011, Springer, 2012, pp. 27-32.
Rousseeuw, Peter J., and Christophe Croux. "Alternatives to the median absolute deviation." Journal of the American Statistical Association 88.424 (1993), pp. 1273-1283.
Ryan Compton, David Jurgens, David Allen, "Geotagging One Hundred Million Twitter Accounts with Total Variation Minimization," arXiv preprint arXiv:1404.7152, (2014), pp. 1-9.
https://www.tumblr.com/about downloaded Dec. 2014.
http://gnip.com/tumblr/ downloaded Dec. 2014.
Ryan Compton, Craig Lee, Tsai-Ching Lu, Lalindra De Silva, Michael Macy, "Detecting Future Social Unrest in Unprocessed Twitter Data", IEEE International Conference on Intelligence and Security Informatics (ISI), 2013, pp. 56-60.
Sandra Gonzalez-Ballon, Javier Borge-Holthoefer, Alejandro Rivero, Yamir Mareno, "The Dynamics of Protest Recruitment through an Online Network", Nature Scientific Reports, vol. 1, Article 197, Dec. 2011, doi: 10.1038/srep00197.
Ekaterina Stepanova, "The Role of Information Communication Technologies in the 'Arab Sping'", PONARS Eurasia Policy Memo No. 159, 2011.
F. Chen, J. Arredondo, R. P. Khandpur, C.-T. Lu, D. Mares, D. Gupta, and N. Ramakrishnan, "Spatial surrogates to forecast social mobilization and civil unrests," Position Paper in CCC Workshop on "From GPS and Virtual Globes to Spatial Computing", 2012.
Ting Hua, Feng Cheng, Liang Zhao, Chang-Tien Lu, Naren Ramakrishnan, "STED: Semi-Supervised Targeted Event Detection", KDD '13 Proceedings of the 19th ACM SIGKDD international conference on Knowledge discovery and data mining, pp. 1466-1469, Aug. 11-14, 2013.
David Jurgens, "That's what friends are for: inferring location in online social media platforms based on social relationships", Proceedings of the Seventh International AAAI Conference on Weblogs and Social Media, ICWSM 2013.
Colbaugh, R., Glass, K., "Early Warning Analysis for Social Diffusion Events", IEEE International Conference on Intelligence and Security Informatics, (ISI), 2010, pp. 37-42.
Weng, J., Yao, Y., Leonardi, E., Lee, F., "Event Detection in Twitter", International Conference on Weblogs and Social Media, 2011.
Weerkamp, W., De Rijke, M., "Activity Prediction: A Twitter-based Exploration", SIGIR Workshop on Time-aware Information Access, 2012.
Xu, J., et al., "Civil Unrest Prediction: A Tumblr-Based Exploration," Social Computing, Behavioral-Cultural Modeling and Prediction Lecture Notes in Computer Science vol. 8393, 2014, pp. 403-411.
S. Ahern, M. Naaman, R. Nair. And J. H.-I. Yang. World explorer: Visualizing aggregate data from unstructured text in geo-referenced collections. In Proceedings of JCDL '07, pp. 1-10. New York, NY. USA, 2007. ACM.
A. Ahmed, L. Hong, and A. J. Smola. Hierarchical geographical modeling of user locations from social media posts. In Proceedings of the 22Nd international Conference on World Wide Web, WWW '13, pp. 25-36, Republic and Canton of Geneva, Switzerland, 2013. International World Wide Web Conferences Steering Committee.
E. Amitay, N. Har'El, R. Sivan, and A. Soffer. Web-a-where: geotagging web content. In Proceedings of SIGIR '04, pp. 273-280. ACM, 2004.
X. Bresson, T. Laurent, D. Uminsky, and J. H. von Brecht. Multiclass total variation clustering. In Advances in Neural Information Processing Systems, 2013.
R. Compton, D. Jurgens, and D. Allen. Geotagging one hundred million twitter accounts with total variation minimization. arXiv preprint arXiv:1404.7152, 2014.
R. Compton, C. Lee, T.-C. Lu, L. De Silva, and M. Macy. Detecting future social unrest in unprocessed twitter data:"emerging phenom- (56) References Cited

OTHER PUBLICATIONS ena and big data". In Intelligence and Security Informatics (ISI), 2013 IEEE International Conference on, pp. 56-60. IEEE, 2013.
D. J. Crandall, L. Backstrom, D. Huttenlocher, and J. Kleinberg. Mapping the world's photos. In Proceedings of WWW '09, pp. 761-770, New York, NY, USA, 2009. ACM.
J. Gelernter and S. Balaji. An algorithm for local geoparsing of microtext. GeoInformatica, 17(4), pp. 635-667, Jan. 2013.
J. Gelernter, G. Ganesh, H. Krishnakumar, and W. Zhang. Automatic gazetteer enrichment with user-geocoded data. In Proceedings of GEOCROWD '13, pp. 87-94. New York, NY, USA, 2013. ACM.
T. Goldstein and S. Osher. The split bregman method for l1 regularized problems. pp. 1-21.
N. Ireson and F. Ciravegna. Toponym resolution in social media. In Proceedings of ISWC '10, pp. 370-385, Berlin, Heidelberg, 2010. Springer-Verlag.
D. Jurgens. Thats what friends are for: Inferring location in online social media platforms based on social relationships. In Seventh International AAAI Conference on Weblogs and Social Media, 2013, pp. 273-282.
P. Kelm, V. Murdock, S. Schmiedeke, S. Schockaert, P. Serdyukov, and O. Van Laere. Georeferencing in social networks. In Social Media Retrieval, pp. 115-141. Springer, 2013.
K. Leetaru and P. A. Schrodt. Gdelt: Global data on events, location, and tone, 1979-2012. In Paper presented at the ISA Annual Convention, vol. 2, p. 4, 2013.
K. Leetaru, S. Wang, G. Cao, A. Padmanabhan, and E. Shook. Mapping the global twitter heartbeat: The geography of twitter, First Monday, 18(5), 2013.
J. L. Leidner. Toponym resolution in text: "Which Sheffield is it?". In Proceedings of SIGIR '04 p. 602, 2004.
M. D. Lieberman, H. Samet, and J. Sankaranarayanan, Geotagging with local lexicons to build indexes for textually-specified spatial data, In Proceedings of ICDE'10, pp. 201-212, 2010.
J. Mahmud, J. Nichols, and C. Drews. Where is this tweet from? inferring home locations of twitter users. In ICWSM, 2012, pp. 511-514.
K. S. McCurley. Geospatial mapping and navigation of the web. In Proceedings of WWW '01, pp. 221-229, New York, NY, USA, 2001, ACM.
N. O'Hare and V. Murdock. Modeling locations with social media, Inf. Retr., 16(1), pp. 30-62, Feb. 2013.
S. Overell and S. Rüger. Using co-occurrence models for place name disambiguation. Int. J. Geogr. Inf. Sci., 22(3), pp. 285-287, Jan. 2008.
N. Ramakrishnan, P. Butler, S. Muthiah, N. Self, R. Khandpur, P. Saraf, W. Wang, J. Cadena, A. Vullikanti, G. Korkmaz, et al. 'beating the news' with embers: Forecasting civil unrest using open source indicators. arXiv preprint arXiv:1402.7035, 2014.
T. Rattenbury and M. Naaman. Methods for extracting place semantics from flickr tags. ACM Trans. Web. 3(1):111-1:30, Jan. 2009.
L. Rudin, S. Osher, and E. Fatemi. Nonlinear total variation based noise removal algorithms. Physica D: Nonlinear Phenomena, 60(1-4), pp. 259-268, Nov. 1992.
P. Serdyukov, V. Murdock, and R. Van Zwol. Placing flickr photos on a map. In Proceedings of the 32nd international ACM SIGIR conference on Research and development in information retrieval, pp. 484-491. ACM, 2009.
L. M. Smith, M. S. Keegan, T. Wittman, G. O. Mohler, and A. L. Bertozzi, Improving density estimation by incorporating spatial information. EURASIP J. Adv. Signal Process. 2010:7:1-7:12, Feb. 2010.
O. Van Laere, J. Quinn, S. Schockaert, and B. Dhoedt Spatially aware term selection for geotagging. IEEE Trans. on Knowl. and Data Eng., 26(1), pp. 221-234, Jan. 2014.
O. Van Leere, S. Schockaert, and B. Dhoedt. Finding locations of flickr resources using language models and similarity search. In Proceedings of ICMR '11, pp. 48:1-48:8, New York, NY, USA, 2011. ACM.

Y. Vardi and C. H. Zhang, The multivariate L1-median and associated data depth. Proceedings of the National Academy of Sciences of the United States of America, 97, No. 4 (2000), pp. 1423-1426.
J. Xu, T.-C, Lu, R. Compton, and D. Allen. "Quantifying cross-platform engagement through large-scale user alignment." In Proceedings of the 2014 ACM conference on Web science, pp. 281-282. ACM, 2014.
Y. Yamaguchi, T. Amagasa, and H. Kitagawa. Landmark-based user location inference in social media. In Proceedings of the First ACM Conference on Online Social Networks, COSN '13, pp. 223-234, New York, NY, USA, 2013. ACM.
Z. Yin, L. Cao, J. Han, C. Zhai, and T. Huang. Geographical topic discovery and comparison. In Proceedings of WWW '11, p. 247, New York, New York, USA, 2011. ACM Press.
X. Zhu and Z. Ghahramani. Learning from labeled and unlabeled data with label propagation. Technical report, Technical Report CMU-CALD-02-107, Carnegie Mellon University, 2002.
Communication regarding European Search Report and the European Search Opinion for European Regional Phase Patent Application No. 14780262.3, mailed Oct. 13, 2016.
Search strategy in the European Search for European Regional Phase Patent Application No. 14780262.3, mailed Oct. 13, 2016.
Search Report in the European Search for European Regional Phase Patent Application No. 14780262.3, mailed Oct. 13, 2016.
Search Opinion for European Regional Phase Patent Application No. 14780262.3, mailed Oct. 13, 2016.
Lars Backstrom et al: "Find me if you can," Proceedings of the 19th International Conference on World Wide Web. WWW '10. Jan. 1, 2010 (Jan. 1, 2010). XP055188728. New York. New York. USA, pp. 51-69.
Tatiana Pontes et al: "Beware of What You Share: Inferring Home Location in Social Networks." Data Mining Workshops (ICDMW). 2012 IEEE 12th International Conference on. IEEE. Dec. 10, 2012 (Dec. 10, 2012). pp. 571-578. XP032303104.
Clodoveu A. Davis Jr. et al: "Inferring the Location of Twitter Messages Based on User Relationships." Transactions in GIS. vol. 15. No. 6. Dec. 22, 2011 (Dec. 22, 2011). pp. 735-751. XP055305589. GB.
David Jurgens: "That' s What Friends Are For: Inferring Location in Online Social Media Platforms Based on Social Relationships,"Jun. 27, 2013 (Jun. 27, 2013). pp. 273-282. XP055307355. Retrieved from the Internet: URL:http://www.aaai.orgjocsjindex.php/ICWS M/ICWSM13/paperjviewFile/6067/6366 [retrieved on Oct. 4, 2016].
K. Leetaru and P. Schrodt, "GDELT: Global data on events, location, and tone, 1979-2012," Pap. Present., International Studies Association, ISA, pp. 1979-2012, 2013.
M. T. Malik, A. Gumel, L. H. Thompson, T. Strome, and S. M. Mahmud, "'Google Flu Trends' and Emergency Department Triage Data Predicted the 2009 Pandemic H1N1 Waves in Manitoba," Canadian Journal of Public Health, vol. 102, issue No. 4, pp. 294-297, 2011.
F. Pervaiz, M. Pervaiz, N. Abdur Rehman, and U. Saif, "FluBreaks: early epidemic detection from Google flu trends," J. Med. Internet Res., vol. 14, No. 5, pp. e125-1-e125-16, Jan. 2012.
S. P. O'Brien, "Crisis Early Warning and Decision Support: Contemporary Approaches and Thoughts on Future Research," Defense Advanced Research Projects Agency International Studies Review (Impact Factor: 0.74), 12(1): pp. 87-104, 2010.
6. M. D. Ward, A. Beger, J. Cutler, C. Dorff, and B. Radford, "Comparing GDELT and ICEWS Event Data," vol. 1, pp. 1-10, 2013, Wardlab.
Ward, Michael D et al. 2012. "Geographical Models of Crises: Evidence from ICEWS". In Advances in Design for Cross-Cultural Activities, Part I, Advances in Design for Cross-Cultural Activities, Part I, Dylan D Schmorrow and Denise M Nicholson. Boca Raton, FL: CRC Press, pp. 429-438.
P. A. Grabowicz and V. M. Eguíluz, "Heterogeneity shapes groups growth in social online communities," EPL Europhysics Lett., vol. 97, No. 2, pp. 28002-p1-28002-p5, 2012.
D. Braha, "Global civil unrest: contagion, self-organization, and prediction," PLoS One, vol. 7, No. 10, pp. e48596-1-e48596-9, Jan. 2012.

(56) References Cited

OTHER PUBLICATIONS

H. Becker, M. Naaman, and L. Gravano, "Beyond Trending Topics: Real-World Event Identification on Twitter," International Conference on Web and Social Media, ICWSM, pp. 1-17, 2011.
A. Zubiaga, D. Spina, and R. Martinez, "Classifying Trending Topics: A Typology of Conversation Triggers on Twitter," Evaluation. pp. 8-11, 2011.
J. Story, M. Hall, and J. Wickstra, "Discovering Trending Topics on Twitter Via Retweets," Computer (Long. Beach. Calif), 2011, pp. 1-6.
N. Pervin, F. Fang, A. Datta, K. Dutta, and D. Vandermeer, "Fast, Scalable, and Context-Sensitive Detection of Trending Topics in Microblog Post Streams," ACM Trans. Manag. Inf. Syst., vol. 3, pp. 1-24, 2013.
L. Aiello, G. Petkos, and C. Martin, "Sensing trending topics in Twitter," IEEE Transactions on Multimedia, vol. 15, No. 6, pp. 1268-1282, 2013.
D. Wilkinson and M. Thelwall, "Trending Twitter topics in English: An international comparison," J. Am. Soc. Inf. Sci. Technol., vol. 63, pp. 1631-1646, 2012.
L. Hong, A. Ahmed, S. Gurumurthy, A. J. Smola, and K. Tsioutsiouliklis, "Discovering geographical topics in the Twitter stream," Proc. 21st Int. Conf. World Wide Web—WWW '12, pp. 769-779, 2012.
D. Jurgens, "That's What Friends Are For: Inferring Location in Online Social Media Platforms Based on Social Relationships," in Proceedings of the Seventh International AAAI Conference on Weblogs and Social Media That's, 2013, pp. 273-282.
L. Hong, A. Ahmed, and S. Gurumurthy, "Discovering geographical topics in the Twitter stream," in Proceedings of the 21st international conference on World Wide Web, pp. 769-778, 2012.
M. Krstajic, C. Rohrdantz, M. Hund, and A. Weiler, "Getting there first: real-time detection of real-world incidents on Twitter," in 2nd Workshop on Interactive Visual Text Analytics: Task-Driven Analysis of Social Media Content with Visweek'12, 2012, pp. 2-5.
T. Kraft, D. X. Wang, J. Delawder, W. Dou, and W. Ribarsky, "Less After-the-Fact: Investigative visual analysis of events from streaming Twitter," 2013 IEEE Symp. Large-Scale Data Anal. Vis., pp. 95-103, Oct. 2013.
S. Ardon, A. Bagchi, A. Mahanti, A. Ruhela, A. Seth, R. M. Tripathy, and S. Triukose, "Spatio-temporal and events based analysis of topic popularity in Twitter," in Proceedings of the 22nd ACM international conference on Conference on information & knowledge management, 2013, pp. 219-228.
R. Compton, C. Lee, J. Xu, L. Artieda-moncada, T. Lu, L. De Silva, and M. Macy, "Using publicly visible social media to build detailed forecasts of civil unrest." Security Informatics, pp. 1-11, 2013.
Manrique, H. Qi, A. Morgenstern, N. Velasquez, T.-C. Lu, and N. Johnson, "Context matters: Improving the uses of big data for forecasting civil unrest: Emerging phenomena and big data," 2013 IEEE International Conference on Intelligence and Security Informatics. IEEE, pp. 169-172, Jun. 2013.
C. A. A. Beauchemin and A. Handel, "A review of mathematical models of influenza A infections within a host or cell culture: lessons learned and challenges ahead," BMC Public Health, vol. 11, No. suppl 1, pp. S7-1-S7-15, 2011.
E. O. Nsoesie, R. J. Beckman, S. Shashaani, K. S. Nagaraj, and M. V Marathe, "A Simulation Optimization Approach to Epidemic Forecasting.," PLoS One, vol. 8, No. 6, pp. e67164-1-e67164-10, Jan. 2013.
L. N. Murillo, M. S. Murillo, and A. S. Perelson, "Towards multiscale modeling of influenza infection," J. Theor. Biol., vol. 332, pp. 267-290, Sep. 2013.
J. Ginsberg, M. H. Mohebbi, R. S. Patel, L. Brammer, M. S. Smolinski, and L. Brilliant, "Detecting influenza epidemics using search engine query data," Nature, vol. 457, No. 7232, pp. 1012-1015, 2009.
H. A. Carneiro and E. Mylonakis, "Google Trends: A Web-Based Tool for Real-Time Surveillance of Disease Outbreaks," Clin. Infect. Dis., vol. 49, No. 10, pp. 1557-1564, 2009.
A. F. Dugas, et al. "Influenza Forecasting with Google Flu Trends." (2013) PLoS ONE 8(2): pp. e56176-1-e56176-7. doi:10.1371/journal.pone.0056176.
M. Kang, H. Zhong, J. He, S. Rutherford, and F. Yang, "Using Google Trends for Influenza Surveillance in South China," PLoS One, vol. 8, No. 1, 2013, pp. e55205-1-e55205-6.
X. Zhou, Q. Li, Z. Zhu, and H. Zhao, "Monitoring Epidemic Alert Levels by Analyzing Internet Search Volume," IEEE Trans. Biomed. Eng., vol. 60, No. 2, pp. 446-452, 2013.
K. Wilson and J. S. Brownstein, "Early detection of disease outbreaks using the Internet," CMAJ, vol. 180, No. 8, pp. 329-331, Apr. 2009.
B. M. Althouse, Y. Y. Ng, and D. A. T. Cummings, "Prediction of Dengue Incidence Using Search Query Surveillance," PLoS Negl. Trop. Dis., vol. 5, No. 8, pp. e1258-1-e1258-7, 2011.
P. M. Polgreen, Y. Chen, D. M. Pennock, and F. D. Nelson, "Using internet searches for influenza surveillance," Clin. Infect. Dis., vol. 47, No. 11, pp. 1443-1148, Dec. 2008.
A. Hulth and G. Rydevik, "GET WELL: an automated surveillance system for gaining new epidemiological knowledge," BMC Public Health, vol. 11, 2011, pp. 252-1-252-8.
L. Samaras, E. Garcia-Barriocanal, and M.-A. Sicilia, "Syndromic surveillance models using Web data: the case of scarlet fever in the UK," Inform. Health Soc. Care, vol. 37, No. 2, pp. 106-124, Mar. 2012.
X. Zhou, J. Ye, and Y. Feng, "Tuberculosis surveillance by analyzing Google trends," IEEE Trans. Biomed. Eng., vol. 58, No. 8, pp. 2247-2254, Aug. 2011.

* cited by examiner

FIG. 1

| | Geometric Median + FourSquare | Geometric Median | Social Triangle | Upper Bound |
|---|---|---|---|---|
| City Name Match | 0.32 | 0.35 | 0.36 | 0.48 |
| State Name Match | 0.67 | 0.68 | 0.72 | 0.79 |
| Country Name Match | 0.93 | 0.93 | 0.94 | 0.95 |
| Median Error (km) | 11.1 | 10.8 | 8.43 | 4.50 |
| Percent Located | 96.2 | 95.5 | 54.2 | |

INFERRING THE LOCATION OF USERS IN ONLINE SOCIAL MEDIA PLATFORMS USING SOCIAL NETWORK ANALYSIS

GOVERNMENT LICENSE RIGHTS

This invention was made with government support under U.S. Government Contract Number D12PC00285. The government may have certain rights in the invention.

CROSS-REFERENCE TO RELATED APPLICATIONS

This is a Non-Provisional patent application of U.S. Provisional Application No. 61/809,160, filed in the United States on Apr. 5, 2013, entitled, "Inferring the Location of Users in Online Social Media Platforms Using Social Network Analysis."

BACKGROUND OF THE INVENTION (1) Field of Invention

The present invention relates to a system for inferring the location of users in online social media platforms and, more particularly, to a system for inferring the location of users in online social media platforms using social network analysis.

(2) Description of Related Art

Social media provides a new data source for observing the rapidly changing focus of public interests. Detecting the location from which a message originates provides a powerful way of aggregating content spatially. This spatial focus enables detecting regional differences, detecting emerging trends specific to regions, or even measuring information flow. However, little content is connected with ground truth location data.

Several works have examined location inference on the Twitter™ social media platform. Cheng et al. (see the List of Incorporated Cited Literature References, Literature Reference No. 1), Mahmud et al. (see Literature Reference No. 6), and Ikawa et al. (see Literature Reference No. 5) have examined using the text content produced by a user for inferring their location. While this has produced good results, the approach is limited to only those users who generated text that contained geographic references. Furthermore, their approaches were only tested on English.

Sadilek et al. (see Literature Reference No. 9) perform social network inference in order to estimate the user's true location. However, their approach requires that both users' locations be known in order to estimate the social relationship, which limits the approach to only those individuals with known locations.

Davis Jr. et al. (see Literature Reference No. 2) use a user's follower network in Twitter™ to perform location inference. They use only one round of standard label propagation to infer the location, which can result in limited coverage. Furthermore, their work was tested only on a small set of users, so whether their work is generalizable to larger sets of users remains untested.

Hetch et al. (see Literature Reference No. 4) and Pontes et al. (see Literature Reference No. 8) infer user locations from self provided location information in Twitter™ and FourSquare™, respectively. While Pontes et al. (see Literature Reference No. 8) reported more than 90% coverage of users with this method, no attempt was made to infer the locations of the remaining users. Hetch et al. (see Literature Reference No. 4) found significantly less information in Twitter™ with a high error rate.

Each of the prior methods described above exhibit limitations that make them incomplete. Thus, a continuing need exists for a method for inferring a user's location from their social network and a small amount of ground truth data using an inferred social network designed to maximize the location inference accuracy.

SUMMARY OF THE INVENTION

The present invention relates to system for inferring the location of users in online social media platforms and, more particularly, to a system for inferring the location of users in online social media platforms using social network analysis. The system comprises one or more processors and a memory having instructions such that when the instructions are executed, the one or more processors perform multiple operations. The system extracts a social network from data from at least one social media platform, wherein the social network comprises a plurality of users connected through social relationships, and wherein each user in the plurality of users has an identity on each social media platform. A mapping in the social network is generated from each user in the plurality of users to the user's estimated geographical location, resulting in an estimated location mapping Est. Then a mapping in the social network is generated from each user in the plurality of users having known geographical location data to the user's known geographical location, resulting in a known location mapping SL. The estimated location mapping Est is updated to have the same mapping as the known location mapping SL until a predetermined convergence criteria is met. For each user j in the plurality of users having a mapping in the known location mapping SL, the location of j in a current estimated location mapping Est' is updated to be the location in the known location mapping SL. For each user in the plurality of users in a group of users N having a social relationship with j and having a mapping in the estimated location mapping Est, the estimated geographical location of the users in N is added to a set of locations NL. A set of final geographical locations of the users in N is estimated using a geometric median metric. The users in N are mapped to their final estimated geographical locations in the social network.

In another aspect, the system provides a subgraph of the social network for N and the set of locations NL. The current estimated location mapping Est' is updated with the final estimated geographical locations of the users in N, and the mappings in the estimated location mapping Est are replaced with those in the current estimated location mapping Est'.

In another aspect, the system combines a user's identities from all social media platforms, such that each user is represented as a single individual in the social network.

In another aspect, estimated geographical location data and known geographical location data from all social media platforms for a user is merged.

In another aspect, only those users in N who also have social relationships with each other are selected for geographical location estimation using the geometric median metric.

In another aspect, the present invention also comprises a method for causing a processor to perform the operations described herein.

In yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for inferring the location of users in online social media platforms and, more particularly, to a system for inferring the location of users in online social media platforms using social network analysis. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Finally, specific details of the present invention are provided to give an understanding of the specific aspects.

(1) LIST OF INCORPORATED CITED LITERATURE REFERENCES

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. Cheng, Z.; Caverlee, J.; and Lee, K. 2010. You are where you tweet: a content-based approach to geo-locating twitter users. In Proceedings of the 19th ACM international conference on Information and knowledge management, 759-768. ACM.
2. Davis Jr, C.; Pappa, G.; de Oliveira, D.; and de L Arcanjo, F. 2011. Inferring the location of twitter messages based on user relationships. Transactions in GIS 15(6):735-751.
3. Goldenberg, J., and Levy, M. 2009. Distance is not dead: Social interaction and geographical distance in the internet era. arXiv preprint arXiv:0906.3202.
4. Hecht, B.; Hong, L.; Suh, B.; and Chi, E. 2011. Tweets from Justin Bieber's heart: the dynamics of the location field in user profiles. In Proceedings of the 2011 annual conference on Human factors in computing systems, 237-246. ACM.
5. Ikawa, Y.; Enoki, M.; and Tatsubori, M. 2012. Location inference using microblog messages. In Proceedings of the 21st international conference companion on World Wide Web, 687-690. ACM.
6. Mahmud, J.; Nichols, J.; and Drews, C. 2012. Where is this tweet from?inferring home locations of twitter users. Proc AAAI ICWSM 12.
7. Mok, D.; Wellman, B.; and Carrasco, J. 2010. Does distance matter in the age of the internet? Urban Studies 47(13): 2747-2783.
8. Pontes, T.; Vasconcelos, M.; Almeida, J.; Kumaraguru, P.; and Almeida, V. 2012. We know where you live: Privacy characterization of foursquare behavior. In UbiComp '12.
9. Sadilek, A.; Kautz, H.; and Bigham, J. 2012. Finding your friends and following them to where you are. In Proceedings of the fifth ACM international conference on Web search and data mining, 723-732. ACM.
10. Zhu, Xiaojin, and Zoubin Ghahramani. Learning from labeled and unlabeled data with label propagation. Technical Report CMU-CALD-02-107, Carnegie Mellon University, 2002.
11. Vincenty, Thaddeus. Direct and inverse solutions of geodesics on the ellipsoid with application of nested equations. Survey review 23.176 (1975): 88-93.
12. Ronkainen, Oja, and Orponen. 2003. Computation of the multivariate Oja median. Developments in Robust Statistics, 344-359.

13. Vardi and Zhang. 2000. The multivariate L1-median and associated data depth. Proceedings of the National Academy of Sciences. 97(4): 1423-6.

(2) PRINCIPAL ASPECTS

The present invention has three "principal" aspects. The first is a system for inferring the location of users in online social media platforms. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for inferring the location of users in online social media platforms. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(3) SPECIFIC DETAILS

Described is a system that leverages social relationships in online social media platforms. Recent work has demonstrated that the locality of social relationships still permeates the online space with a strong bias towards having online social relationships with individuals that are nearby (see Literature Reference Nos. 3 and 7). Accordingly, when the locations of a user's relations are aggregated, they present a noisy, but useful, source of data from which the user's location can be inferred.

Figure 1:
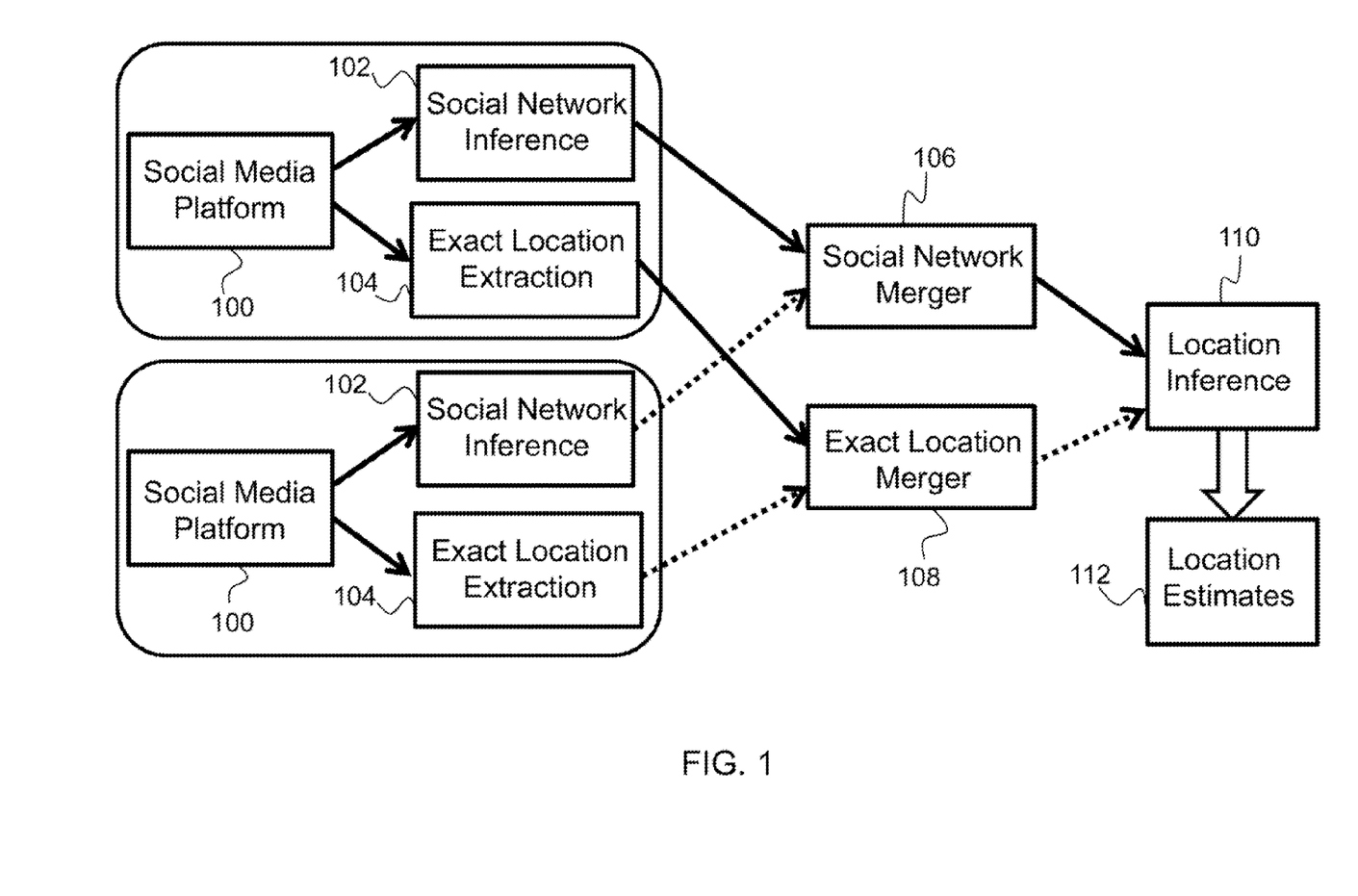
FIG. 1 is a flow diagram for inferring the location of users in online social media platforms using social network analysis according to the principles of the present invention.

FIG. 1 illustrates the information flow according to the principles of the present invention. The method begins with one or more social network platforms. FIG. 1 depicts multiple social media platforms 100, though the method is generalizable from a single platform to any number of platforms. All that is required is that the social medial platforms 100 have some explicitly stated or implicitly visible social relationships.

Once the social media platforms 100 have been selected, two stages appear in parallel. A social network inference stage 102 is responsible for extracting the social network from the available data from the social media platform 100. As a non-limiting example and in experimental studies using the system according to the principles of the present invention, both the Twitter™ and FourSquare™ social media platforms were used.

The Twitter™ network offers implicit and explicit networks. It was found that the implicit network is generated by observing users who have both communicated with each other at least once. This implicit network is referred to as the mention network. In contrast. FourSquare™ allows users to explicitly state their friendship with each other. These relationships can be accessed using the FourSquare™ application programming interface (API). As can be appreciated by one skilled in the art, the present invention is also generalizable to other types of social media platforms that have different social network constraints. For instance, the present invention was also tested using the Twitter™ follower network, which generated good performance, but not as high as the performance of the mention network.

Concurrently with the social network inference stage 102, the social media platform's 100 data is mined to obtain a list of ground truth locations for users. These locations form the seed locations from which other user's locations may be inferred in an exact location extraction stage 104. For the Twitter™ platform, global positioning system (GPS)-tagged messages were used as a source of ground truth information. These messages occur rarely, accounting for approximately 0.7% of all messages. For each user with GPS-tagged tweets, those users that have at least five messages that all occur within a 30 kilometer (km) distance of each other are selected. This effectively removes individuals with too few tweets and those users who travel frequently and tweet from many locations. From the remaining users, each user's location is estimated as the location that is the L1 multivariate median (i.e., geometric multivariate mean) among the locations of their tweets, as will be described in detail below.

In the FourSquare™ platform, users may specify their location in their profile. Literature Reference No. 8 reported that this location is reliable, and the source of information covers over 90% of the users. Through testing it was confirmed that this self-reported location matched the location computed from non-FourSquare™ data for that user. Therefore, that location data was selected for use in the system according to the principles of the present invention. The data itself is in the form of a text name, which must then be converted to a specific coordinate location. The Google™ Geocoding API developed by Google™ along with the GeoNames geographical database was used to map each name to a canonical latitude and longitude.

Referring to FIG. 1, a single individual may have multiple identities on different social media platforms 100. A social network merger stage 106 combines those identities together so that an individual is represented only as a single node in the inferred social network. In one aspect, the system according to the principles of the present invention uses metadata provided by users to link their FourSquare™ and Twitter™ accounts. This approach is generalizable to work on other social media platforms such as LinkedIn™ and Tumblr™. However, additional methods could be used that infer common identities from the user's profiles or discussed content.

Multiple social media platforms 100 may report different location data for the same user. An exact location merger stage 108 merges the combined information together, using all available location data from the different social media platforms 100 as well as the discovery of an individual's multiple identities on those social media platforms 100. A priority-based ranking was used, reporting the location extracted from GPS data from Twitter™, and, if not available, using the location reported on FourSquare™. Further work could generalize this to fuse the two based on the amount of GPS data available, or to use the FourSquare™ location as a prior when computing the location from the GPS data.

Once the network has been constructed and seed locations have been computed, the locations of the remaining individuals in the social network may be inferred in a location inference stage 110. The locations of the remaining individuals in the social network may be estimated in a location inference stage 110 to generate location estimates. The location estimates are then used in the final location estimates stage 112. The present invention comprises a process that derives from a standard label propagation framework, but takes geography into account when selecting the new label. Literature Reference No. 10 provides a description of a standard label propagation framework. The process according to the principles of the present invention proceeds as follows:

---

1. Let SN be the social network
2. Let Est be a mapping from an individual to their estimated location
3. Let SL be a mapping from an individual to their known location (seed locations)
4. Update Est to have the same mapping as SL
5. Repeat until some convergence criteria is met
    a) Let Est' be the updated individual->location mapping for this iteration
    b) For each individual j
        i. if j has a mapping in SL
            1. Update the location of j in Est' to be the location in SL
            2. Continue to next individual in step (b)
        ii. Let N be the set of individuals who have a social relationship with j
        iii. Let NL be a set of locations
        iv. For each individual k in N
            1. If k has a mapping in Est
                a. Add the location of k in Est to NL
        v. Estimate the location of j using a geometric median, providing the subgraph of the social network for N and the locations NL
        vi. Update Est' with the new location of j
    c) Replace the mappings in Est with those in Est'

---

The estimate of individual j's location is the geometric median of j's neighbors' locations, where k is used to denote the neighbors, and j denotes the user that is being estimated in step b) above.

Key to the process outlined above is the estimation step in (5.b.v). Traditional label propagation would select the new location for individual k as the location that appears most frequently amongst its neighbors. However, this ignores the fact that the labels are related. Because the labels are actually locations, they may be spatially compared to reveal more information about where the individual could be located. Therefore, the system according to the principles of the present invention uses the geometric median to estimate the new location. Furthermore, two strategies are adopted: (1) using the geometric multivariate median only; and (2) first applying a novel heuristic, which is referred to as the "Social Triangle Median." Given a set of points in space $$\{x_i\}_{i=1...n} \overset{def}{=} M,$$

the geometric multivariate median is defined as:

$$m = \min_{x \in M} \sum_{i=1}^{n} w_i d(x, x_i),$$

where $w_i$ is the weight (or multiplicity) of point i, d is a distance function, and x and $x_i$ are two points in space M. Because distances on a globe are being measured, Euclidean distance cannot be applied. Instead, geodetic distance is computed according to the curvature of the Earth using Vincenty's formula (see Literature Reference No. 11).

For the second heuristic, work in social theory that suggests the closest part of an individual's social group should exhibit triadic closure (i.e., if A is friends with B and C, then B and C will also be friends) is leveraged. Therefore, given an individual's relations to others in the inferred network according to the principles of the present invention, prior to estimating the distance, the network is filtered such that only those connected individuals who are also friends with each other (i.e., exhibit triadic closure) will have their locations used for inference. The "social triangle median" is similar to the geometric median used elsewhere. A distinction of the present invention is that edges from the social network which are not part of a closed triangle are removed.

The location inference process (defined by the geometric multivariate median above) is not expected to converge and, therefore, some stopping criterion is needed. As non-limiting examples, a criterion could be a fixed number of iterations, the number of users who have been located, or the percentage change in users with new locations. In experimental studies, it was found that the network was sufficiently covered after a few iterations (usually four), after which the performance did not improve.

Referring to FIG. 1, in the final location estimates stage 112, the individual's locations as determined by the geometric multivariate median are emitted, and individuals are mapped to the final, estimated locations. These locations can serve as strong priors as to where the user's messages come from.

The method described herein was tested using a 10% sample of Twitter™ messages from April 2012 to November 2012. This sample produced a network of bidirectional user mentions with 47,760,573 users and with 254,263,081 inferred social relationships between those users. Using the FourSquare™ API, user profiles and friends of users were crawled, resulting in a network with 3,976,819 users and 17,619,191 relations between these users. Using the information about linked accounts with the two social media platforms, the networks were combined into a single social network that had 50,741,905 unique users, with approximately 1.6 million (M) users having identities in both platforms. The combination of networks also served to validate the social relationship inference on Twitter, with approximately 7.5 M users who had edges in the Twitter™ mention network also having explicitly indicated friendships in the FourSquare™ social network. Locations were extracted for 2,554,064 users in Twitter™, which was approximately 5% of the network.

For evaluation, five-fold cross validation was used. Given the set of seed locations, 80% of those locations were used, and the full inference process depicted in FIG. 1 was performed, stopping after four iterations. The locations of the held-out 20% were then compared with their true locations. The process was repeated using a distinct 20% held-out set for each fold such that all users were evaluated once.

Five metrics were used for evaluation. First, the median error in estimated distance was considered. The distribution of errors follows a power law distribution and, therefore, the median is a preferable estimate of performance compared with the mean. Second, the percentage of the network that was found after four iterations was considered. This loosely corresponds to the recall metrics, but due to the stopping criteria, represents a soft upper bound on the number of users that could be located. The remaining three metrics were all based on name matching. Each latitude and longitude was mapped to a city, state, and country name using a reverse geocoding process. Reverse geocoding is the process of reverse coding of a point location (latitude, longitude) to a readable address or place name. A comparison was made with regards to whether the names mapped to the inferred location matched those of the true location. This evaluation was difficult due to the nature of naming locations; the irregularities in naming boundaries can cause locations that are very close in distance to have distinct names. Furthermore, reverse geocoding is not an exact process and can introduce noise.

Figure 2:
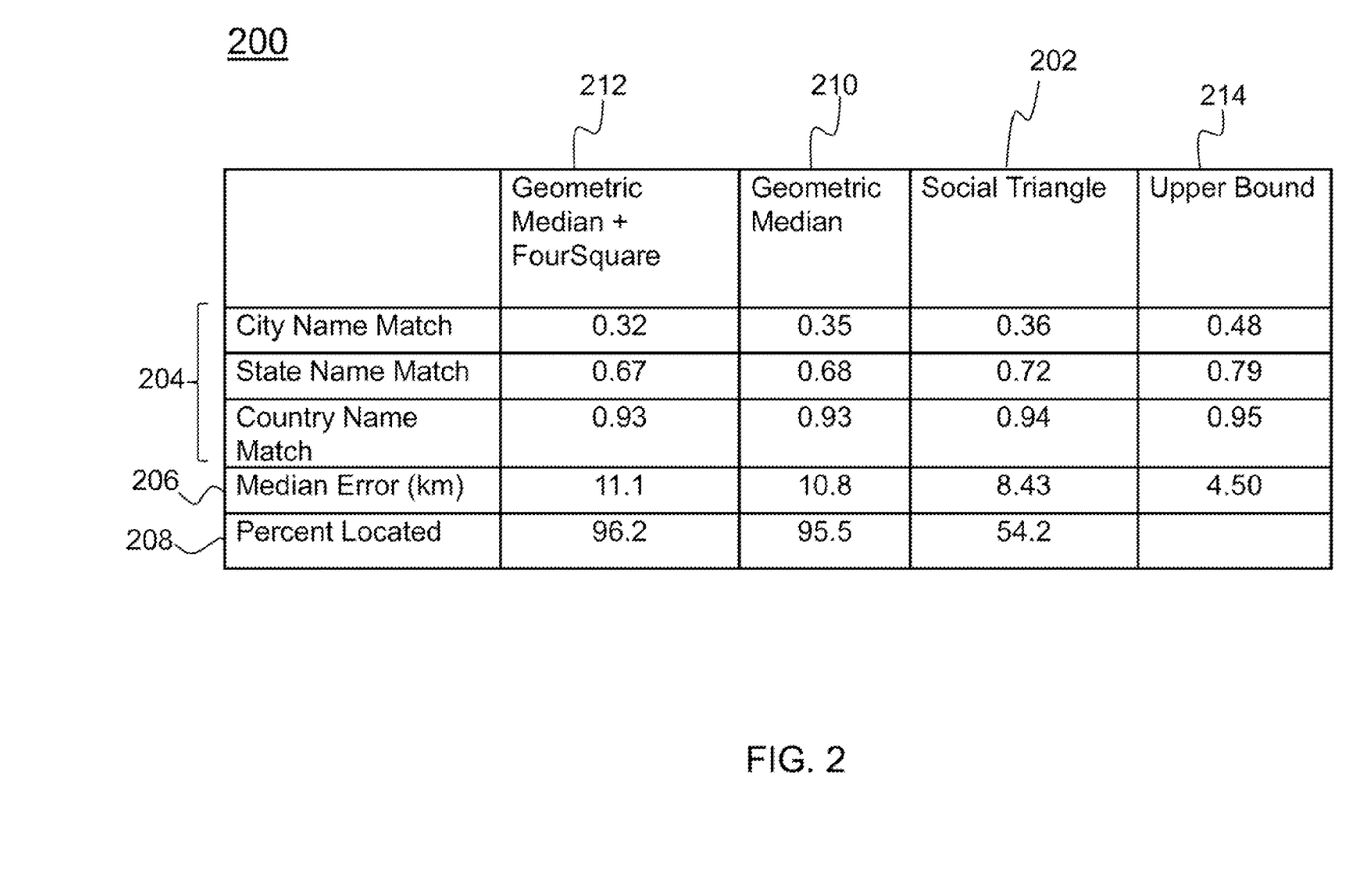
FIG. 2 is a table of performance metrics for user location inference according to the principles of the present invention.

The table 200 in FIG. 2 reports the performance of the experimental study. Specifically, the table 200 highlights three trends in performance. The social triangle 202 heuristic produces the highest performance on the matching metrics 204 and median error metrics 206. By limiting the inference to only those individuals estimated to be in the closer social circle, noise is reduced and accuracy improves. However, due to the constraint that users must have relationships with triadic closer, the method suffers from the lowest recall (i.e., percent located 208), only estimating users for 54% of the network. Further experiments revealed that increasing the number of iterations does not increase this percentage substantially.

In the second trend, using the geometric median 210 (also referred to as geometric multivariate median) alone generated significantly better performance at locating more users (i.e., percent located 208) than when the social triangle 202 is applied. This suggests that despite the noise, the additional locations of users with singleton friendships can still provide sufficient data to estimate an individual's true location. Further experiments with other medians, such as Oja's Simplex Median (see Literature Reference No. 12 for a description of Oja's Simplex Median) and standard label propagation, showed that the geometric median offered the best performance on the matching metrics and median error metrics.

Last, the addition of FourSquare™ relationships (geometric median+FourSquare™ 212) increased the recall by 0.7% while only creating a small drop in performance. Though a small increase percentage-wise, this represents an increase in coverage of over 335,000 new individuals. Further experimentation included adding location information from FourSquare™ profiles. However, the locations of 846,000 additional individuals did not significantly change the performance.

For comparison, the system according to the principles of the present invention was compared against an oracle-based method (upper bound column 214) that always estimates the location of an individual as the location of their closest neighbor. Due to the presence of noise in the neighbors, this should not be considered a true upper bound on performance; however, it does represent what performance would be expected if the closest location was always selected from among the neighboring locations at algorithm initialization time.

In summary, the system according to the principles of the present invention infers the locations of users in arbitrary online social media platforms where users are connected by inferred or explicitly stated social relationships, and where at least a small number of users share their true or estimated location. The invention significantly advances the state-of-the-art by (1) providing better data coverage than is available using current methods and (2) being able to infer locations from users whose associated content in the social media platform offers no indication of their geographic vicinity.

Figure 3:
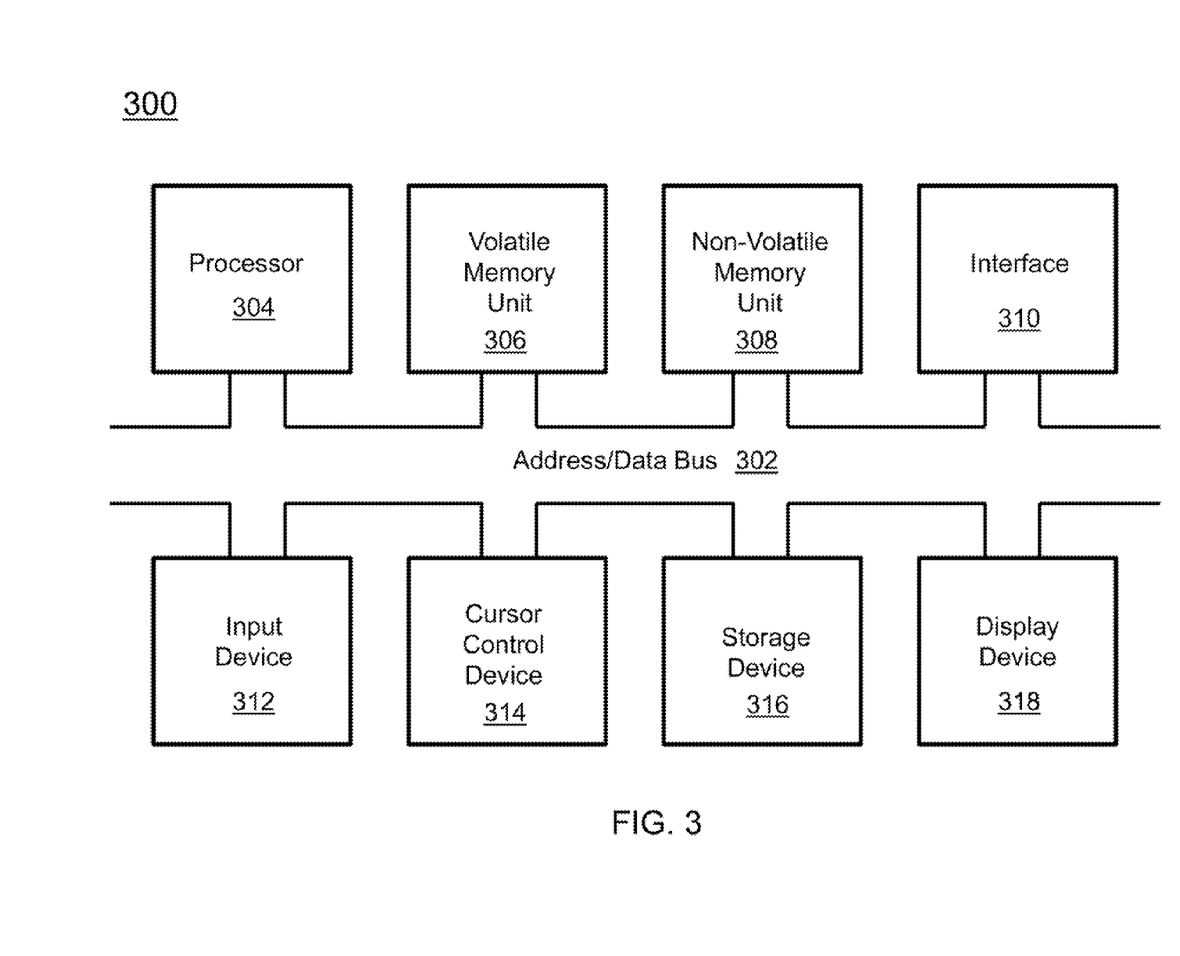
FIG. 3 is an illustration of a data processing system according to the principles of the present invention.

An example of a computer system 300 in accordance with one aspect is shown in FIG. 3. The computer system 300 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 300. When executed, the instructions cause the computer system 300 to perform specific actions and exhibit specific behavior, such as described herein.

The computer system 300 may include an address/data bus 302 that is configured to communicate information. Additionally, one or more data processing units, such as a processor 304, are coupled with the address/data bus 302. The processor 304 is configured to process information and instructions. In one aspect, the processor 304 is a microprocessor. Alternatively, the processor 304 may be a different type of processor such as a parallel processor, or a field programmable gate array.

The computer system 300 is configured to utilize one or more data storage units. The computer system 300 may include a volatile memory unit 306 (e.g., random access memory ("RAM"), static RAM, dynamic RAM, etc.) coupled with the address/data bus 302, wherein a volatile memory unit 306 is configured to store information and instructions for the processor 304. The computer system 300 further may include a non-volatile memory unit 308 (e.g., read-only memory ("ROM"), programmable ROM ("PROM"), erasable programmable ROM ("EPROM"), electrically erasable programmable ROM "EEPROM"), flash memory, etc.) coupled with the address/data bus 302, wherein the non-volatile memory unit 308 is configured to store static information and instructions for the processor 304. Alternatively, the computer system 300 may execute instructions retrieved from an online data storage unit such as in "Cloud" computing. In an embodiment, the computer system 300 also may include one or more interfaces, such as an interface 310, coupled with the address/data bus 302. The one or more interfaces are configured to enable the computer system 300 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 300 may include an input device 312 coupled with the address/data bus 302, wherein the input device 312 is configured to communicate information and command selections to the processor 300. In accordance with one aspect, the input device 312 is an alphanumeric input device, such as a keyboard, that may include alphanumeric and/or function keys. Alternatively, the input device 312 may be an input device other than an alphanumeric input device. In one aspect, the computer system 300 may include a cursor control device 314 coupled with the address/data bus 302, wherein the cursor control device 314 is configured to communicate user input information and/or command selections to the processor 300. In one aspect, the cursor control device 314 is implemented using a device such as a mouse, a track-ball, a track-pad, an optical tracking device, or a touch screen. The foregoing notwithstanding, in one aspect, the cursor control device 314 is directed and/or activated via input from the input device 312, such as in response to the use of special keys and key sequence commands associated with the input device 312. In an alternative aspect, the cursor control device 314 is configured to be directed or guided by voice commands.

In one aspect, the computer system 300 further may include one or more optional computer usable data storage devices, such as a storage device 316, coupled with the address/data bus 302. The storage device 316 is configured to store information and/or computer executable instructions. In one aspect, the storage device 316 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 318 is coupled with the address/data bus 302, wherein the display device 318 is configured to display video and/or graphics. In one aspect, the display device 318 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 300 presented herein is an example computing environment in accordance with one aspect. However, the non-limiting example of the computer system 300 is not strictly limited to being a computer system. For example, one aspect provides that the computer system 300 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 4:
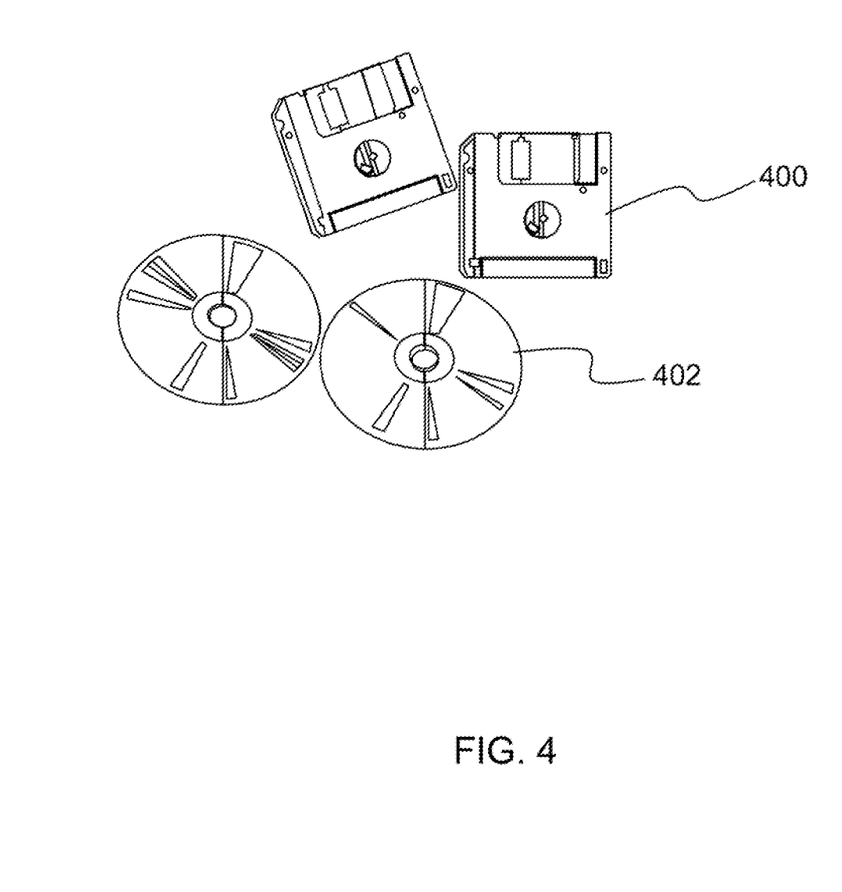
FIG. 4 is an illustration of a computer program product according to the principles of the present invention.

An illustrative diagram of a computer program product embodying the present invention is depicted in FIG. 4. As a non-limiting example, the computer program product is depicted as either a floppy disk 400 or an optical disk 402. However, as mentioned previously, the computer program product generally represents computer readable code (i.e., instruction means or instructions) stored on any compatible non-transitory computer readable medium.

What is claimed is:

1. A system for inferring the location of users of online social media platforms, the system comprising:
   one or more processors and a non-transitory computer-readable medium having instructions encoded thereon such that when the instructions are executed, the one or more processors perform operations of:
   (a) extracting a social network from data from at least one social media platform, wherein the social network comprises a plurality of users connected through social relationships, and wherein each user in the plurality of users has an identity on each social media platform;
   (b) generating a mapping in the social network from each user in the plurality of users to the user's estimated geographical location, resulting in an estimated location mapping Est;
   (c) generating a mapping in the social network from each user in the plurality of users having known geographical location data to the user's known geographical location, resulting in a known location mapping SL;
   (d) updating the estimated location mapping Est to have the same mapping as the known location mapping SL;
   (e) for a user j in the plurality of users having a mapping in the known location mapping SL, updating the location of j in Est' to be the location in the known location mapping SL, wherein Est' is an updated individual-location mapping for a current iteration;
   (f) repeating operation (e) for each user in the plurality of users;
   wherein N is a set of users having a social relationship with user j, and wherein NL is a set of locations;
   (g) for each user k in N having a mapping in Est, adding the estimated geographical location of k in Est to NL;
   (h) estimating a new geographical location of j using a geometric median metric;
   (i) updating Est' with the new geographical location of j;
   (j) iterating through operations (e) through (h) until a stopping criteria is met, wherein the stopping criteria is one of a fixed number of iterations, a number of users who have been located, and a percentage change in users with new geographical locations;
   (k) replacing the mappings in Est with those in Est'; and
   (l) mapping users to final, estimated locations based on the mappings in Est.

2. The system as set forth in claim 1, wherein the one or more processors further perform an operation of:
   providing a subgraph of the social network for N and the set of locations NL.

3. The system as set forth in claim 2, wherein the one or more processors further perform an operation of combining a user's identities from all social media platforms, such that each user is represented as a single individual in the social network.

4. The system as set forth in claim 3, wherein the one or more processors further perform an operation of merging estimated geographical location data and known geographical location data from all social media platforms for a user.

5. The system as set forth in claim 4, wherein the one or more processors further perform an operation of selecting only those users in N who also have social relationships with each other for geographical location estimation using the geometric median metric.

6. A computer-implemented method for inferring the location of users of online social media platforms, comprising an act of:
   causing one or more processors to execute instructions stored on a non-transitory memory such that upon execution, the one or more processors performs operations of:
   (a) extracting a social network from data from at least one social media platform, wherein the social network comprises a plurality of users connected through social relationships, and wherein each user in the plurality of users has an identity on each social media platform;
   (b) generating a mapping in the social network from each user in the plurality of users to the user's estimated geographical location, resulting in an estimated location mapping Est;

(c) generating a mapping in the social network from each user in the plurality of users having known geographical location data to the user's known geographical location, resulting in a known location mapping SL;
(d) updating the estimated location mapping Est to have the same mapping as the known location mapping SL;
(e) for a user j in the plurality of users having a mapping in the known location mapping SL, updating the location of j in Est' to be the location in the known location mapping SL, wherein Est' is an updated individual-location mapping for a current iteration;
(f) repeating operation (e) for each user in the plurality of users;
wherein N is a set of users having a social relationship with user j, and wherein NL is a set of locations;
(g) for each user k in N having a mapping in Est, adding the estimated geographical location of k in Est to NL;
(h) estimating a new geographical location of j using a geometric median metric;
(i) updating Est' with the new geographical location of j;
(j) iterating through operations (e) through (h) until a stopping criteria is met, wherein the stopping criteria is one of a fixed number of iterations, a number of users who have been located, and a percentage change in users with new geographical locations;
(k) replacing the mappings in Est with those in Est'; and
(l) mapping users to final, estimated locations based on the mappings in Est.

7. The method as set forth in claim 6, wherein the one or more processors further performs an operation of:
providing a subgraph of the social network for N and the set of locations NL.

8. The method as set forth in claim 7, wherein the one or more processors further performs an operation of combining a user's identities from all social media platforms, such that each user is represented as a single individual in the social network.

9. The method as set forth in claim 8, wherein the one or more processors further performs an operation of merging estimated geographical location data and known geographical location data from all social media platforms for a user.

10. The method as set forth in claim 9, wherein the one or more processors further performs an operation of selecting only those users in N who also have social relationships with each other for geographical location estimation using the geometric median metric.

11. A computer program product for inferring the location of users of online social media platforms, the computer program product comprising computer-readable instructions stored on a non-transitory computer-readable medium that are executable by a computer having a processor for causing the processor to perform operations of:
(a) extracting a social network from data from at least one social media platform, wherein the social network comprises a plurality of users connected through social relationships, and wherein each user in the plurality of users has an identity on each social media platform;
(b) generating a mapping in the social network from each user in the plurality of users to the user's estimated geographical location, resulting in an estimated location mapping Est;
(c) generating a mapping in the social network from each user in the plurality of users having known geographical location data to the user's known geographical location, resulting in a known location mapping SL;
(d) updating the estimated location mapping Est to have the same mapping as the known location mapping SL;
(e) for a user j in the plurality of users having a mapping in the known location mapping SL, updating the location of j in Est' to be the location in the known location mapping SL, wherein Est' is an updated individual-location mapping for a current iteration;
(f) repeating operation (e) for each user in the plurality of users;
wherein N is a set of users having a social relationship with user j, and wherein NL is a set of locations;
(g) for each user k in N having a mapping in Est, adding the estimated geographical location of k in Est to NL;
(h) estimating a new geographical location of j using a geometric median metric;
(i) updating Est' with the new geographical location of j;
(j) iterating through operations (e) through (h) until a stopping criteria is met, wherein the stopping criteria is one of a fixed number of iterations, a number of users who have been located, and a percentage change in users with new geographical locations;
(k) replacing the mappings in Est with those in Est'; and
(l) mapping users to final, estimated locations based on the mappings in Est.

12. The computer program product as set forth in claim 11, further comprising instructions for causing the processor to perform an operation of:
providing a subgraph of the social network for N and the set of locations NL.

13. The computer program product as set forth in claim 12, further comprising instructions for causing the processor to perform an operation of combining a user's identities from all social media platforms, such that each user is represented as a single individual in the social network.

14. The computer program product as set forth in claim 13, further comprising instructions for causing the processor to perform an operation of merging estimated geographical location data and known geographical location data from all social media platforms for a user.

15. The computer program product as set forth in claim 14, further comprising instructions for causing the processor to perform an operation of selecting only those users in N who also have social relationships with each other for geographical location estimation using the geometric median metric.

* * * * *